United States Patent [19]
Mohr

[11] Patent Number: 5,192,430
[45] Date of Patent: Mar. 9, 1993

[54] SYSTEM FOR DISPENSING LIQUID FUEL TO A MOTOR VEHICLE FUELING STATION

[75] Inventor: Kirby S. Mohr, Tulsa County, Okla.

[73] Assignee: Facet Quantek, Inc., Tulsa, Okla.

[21] Appl. No.: 716,302

[22] Filed: Jun. 17, 1991

[51] Int. Cl.⁵ .................. B01D 35/01; B01D 35/027
[52] U.S. Cl. .................. 210/172; 210/237;
210/323.2; 210/416.4; 210/436; 210/453;
210/462; 210/502.1; 222/189; 137/587
[58] Field of Search .............. 210/96.1, 172, 237,
210/323.2, 416.4, 443, 453, 459, 436, 462, 502.1;
137/587; 222/189

[56] References Cited

U.S. PATENT DOCUMENTS

| | | | |
|---|---|---|---|
| 2,018,901 | 10/1935 | Rush | 210/436 |
| 2,996,190 | 8/1961 | Harry | 210/436 |
| 3,615,016 | 10/1971 | Soriente et al. | 210/323.2 |
| 4,485,011 | 11/1984 | Cole et al. | 210/96.1 |
| 5,122,264 | 6/1992 | Mohr et al. | 210/111 |

Primary Examiner—Robert A. Dawson
Assistant Examiner—Matthew O. Savage
Attorney, Agent, or Firm—Head & Johnson

[57] ABSTRACT

A system for dispensing liquid fuel to a motor vehicle fueling station in which fuel from an underground storage tank is pumped to the motor vehicle fueling station and in which the underground storage tank has a vertical riser pipe extending upwardly therefrom through which fuel is pumped, the system including a vessel having a partition therein dividing it into an upper and a lower zone, the vessel being removable attached to the riser pipe and providing closed communication between fuel pumped from the underground storage tank into the vessel upper zone, one or more filter cartridges positioned in the vessel upper zone and having communication through the filter cartridges into the vessel lower zone, a removable lid closing the vessel top, fuel flowing from the storage tank passing upwardly through the riser pipe and into the interior vessel upper zone, through the filter cartridge and into the vessel lower zone and through an outlet opening communicating with the vessel lower zone and through piping to a motor vehicle fueling system. In a preferred arrangement a vent pipe is provided in the interior of the upper zone, the vent pipe communicating by way of a vent valve to the riser pipe through an internal passageway in the vessel bottom so that gases within the interior of the vessel are conveyed to the underground storage tank. The integrated filtration unit is attachable as a complete unit to the upper end of the riser pipe extending from the underground storage tank.

9 Claims, 3 Drawing Sheets

SYSTEM FOR DISPENSING LIQUID FUEL TO A MOTOR VEHICLE FUELING STATION

BACKGROUND OF THE INVENTION

Fuels most commonly utilized in automobiles and trucks in the United States and other nations of the world are gasoline and diesel which are customarily dispensed directly into vehicle fuel tanks at motor vehicle fueling stations. Such fuel is usually dispensed from an underground storage tank where it is stored in large volumes. A submersible pump extending into or communicating with the storage tank pumps fuel to the aboveground fueling station. The typical fueling station includes one or more metering systems each with a flexible hose and nozzle. Solid contaminants, such as dirt, rust, and the like, have always been a problem when it occurs in vehicle fuel. Water has also been a constant problem in fuels. The problem with particulate and water contaminants is much more serious at the present time than in the past because of the almost universal adoption of fuel injection systems for vehicle engines. Fuel injection systems are considerably more sensitive to particulate matter than earlier type carbureted fuel systems. While diesel engines have always employed fuel injectors, in recent years the use of fuel injectors for gasoline engines has become common.

Distributors of gasoline and diesel fuels have in recent years given increased attention to the requirements of clean fuel. Water is a continuous problem in connection with fuel since tanks, pipelines and so forth in which fuel is stored and/or transported are subject to condensation. Condensation is substantially impossible to prevent and therefore accumulation of some water in stored fuel is inevitable. Water from spill containment manholes at fill risers is also a source of fuel contamination.

In order to combat the possibility of water and/or particulate contaminants from passing into a vehicle fuel tank, fueling stations have employed the use of small canister type filters. These canister type filters are designed to absorb water passing therethrough and intercept contaminants. In order to prevent water from being dispensed with gasoline or diesel fuel, canister filters have been devised that include an internal valve arrangement that closes off when the filter has absorbed a predetermined amount of water. For reference to a filter that functions to shut off in the event of water contamination, see U.S. Pat. No. 4,485,011, issued Nov. 27, 1984, entitled "Fuel Containment Monitor With A Shutoff Valve." This prior issued patent shows the use of a ball functioning as a valve which is moved to a closed position when the pressure drop across a filter element reaches a preselected level due to the absorption of water by the filter element. The ball moves against a seat to prevent further fuel flow through the filter.

An improved canister type filter for closing against fuel flow when a predetermined amount of water has been absorbed by the filter having a valve which, after having moved to the valve closed position, is retained in such position is disclosed in U.S. Pat. No. 4,959,141 entitled "Fuel Filter With Positive Water Shutoff" issued Sep. 25, 1990.

While these water absorbing and flow terminating filter elements have been successful in achieving their intended results of closing against further fuel flow in the event of the absorption of predetermined amounts of water, the application of such filters has been limited since they have typically been employed as canister filters attached aboveground to fuel dispensing units, and such aboveground applications are potentially environmentally contaminating. Therefore, the present disclosure is directed to a liquid fuel dispensing system having means for preventing inadvertent water and particulate contamination which overcomes the problems and limitations with the existing systems as used in service stations today. Particularly, the disclosure herein provides a fuel dispensing system including an underground sump arrangement for receiving a filtration vessel therein and in which the filtration vessel is of a size permitting the use of relatively large filter elements. Larger filter elements require less frequent replacement, thus reducing the atmospheric and ground water contamination that occurs with more frequent replacement of small filter elements attached aboveground directly to fuel dispensing units. Further, the disclosure herein provides an improved integrated filtration unit for use in an overall system of fuel dispensing wherein the pump for pumping the fuel from an underground storage tank to a motor vehicle fueling station and all required filtration to intercept particulate matter and water are achieved within a confined underground sump, the integrated filtration unit being attached to a riser pipe extending upwardly from a fuel storage tank.

This disclosure is related in subject matter to application Ser. No. 07/640,139 filed Jan. 11, 1991, now U.S. Pat. No. 5,122,264, entitled "Liquid Fuel Dispensing System With Improved Means Of Preventing Contamination", Kirby S. Mohr and Thomas F. Wilson, Applicants. The description and drawings of U.S. Pat. No. 5,122,264 are incorporated herein by reference.

SUMMARY OF THE INVENTION

An integrated filtration unit is provided for use in a liquid fuel dispensing system. The dispensing system of the type for which the unit of this invention is used is for dispensing fuel from an underground storage tank to a motor vehicle fueling station. The underground storage tank has a vertical riser pipe extending upwardly therefrom into an underground sump. Received within the riser pipe is a fuel outlet pipe that supports, at the lower end thereof, a submersible pump within the underground storage tank. When the pump is energized fuel is pumped upwardly through the fuel outlet pipe. The filtration unit includes a vessel having a bottom, a sidewall and an open top. The vessel has a partition therein spaced from the bottom dividing the vessel interior into an upper zone and a lower zone, the upper zone being substantially larger in volume than the lower zone. The vessel has an inlet opening in the bottom and an aligned opening in the partition. At least one outlet opening is formed in the vessel bottom or sidewall communicating with the vessel lower zone.

The bottom inlet opening is sealably attachable to the upper end of a vertical riser pipe so that the vessel is supported to the riser pipe and provides closed communication between the interior of the vessel and the underground storage tank.

The fuel outlet pipe extends sealably through the vessel bottom and connects to the opening in the vessel partition. Fuel pumped through the fuel outlet pipe by a submersible pump flows from the underground storage tank into the vessel upper zone.

Formed in the partition is at least one but preferably a plurality of spaced apart adapter openings.

Positioned in each adapter opening is a tubular adapter. A filter cartridge is provided for each of the tubular adapters. Each of the filter cartridges has a lower downwardly extending tubular portion that is removably receivable within an adapter. In the preferred arrangement at least two, three, or four tubular adapters are provided in the vessel partition to accommodate separately the same number of filter cartridges.

Each of the filter cartridges is adaptable to intercept particular matter and/or water.

A lid removably closes the top of the vessel.

Fuel flows upwardly from the underground storage tank by means of a submersible pump into the vessel upper zone. The fuel passes through the filter cartridges and downwardly through the adapters into the vessel lower zone. From the lower zone the fuel, having been cleaned of particulate matter and/or water by the filter cartridges, is passed through the vessel outlet opening, or openings, into piping that connects to a motor vehicle fueling station.

In the preferred arrangement a vertical vent pipe is supported within the vessel upper portion, the open upper end of the vent pipe is adjacent the vessel top and the lower end communicates with the riser pipe. In the preferred arrangement, the vessel bottom has an integral passageway therein communicating with the annular area between the exterior of the fuel outlet pipe and the interior of the riser pipe. In a most preferred embodiment, a valve is provided in communication between the lower end of the riser pipe and the annular area so that the rate of flow of liquids or gases through the riser pipe and the passageway into the annular area and thus, into the interior of the underground storage tank can be regulated.

A better understanding of the invention will be attained from reference to the following description of the preferred embodiment and the claims, taken in conjunction with the attached drawings.

DESCRIPTION OF THE PREFERRED EMBODIMENT

Figure 1:
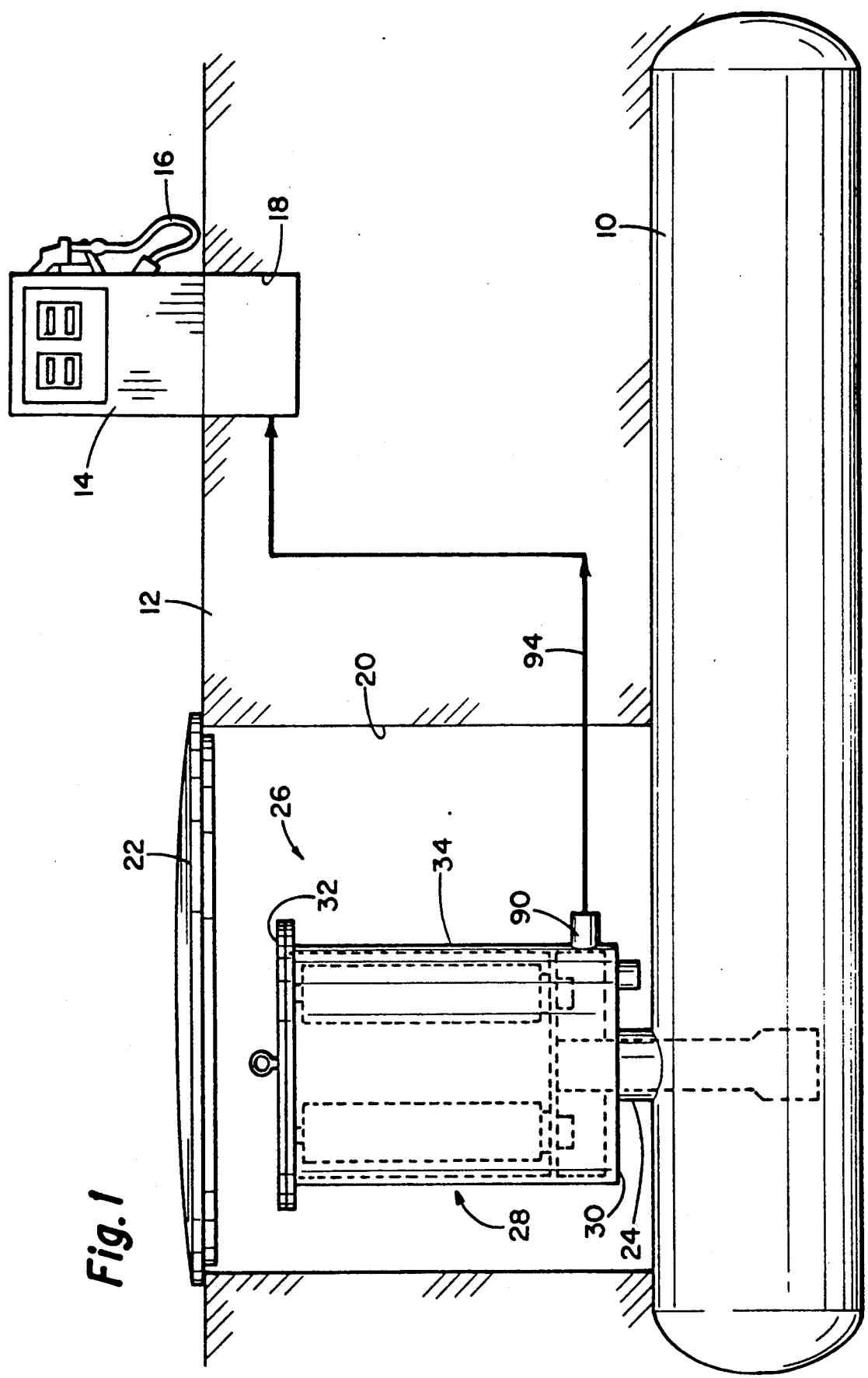
FIG. 1 is an elevational diagrammatic view of a liquid fuel dispensing system that employs the integrated filtration unit of this disclosure. The liquid fuel dispensing system includes an underground fuel storage tank and an underground sump positioned above the fuel storage tank with a riser pipe extending from the fuel storage tank into the sump. Positioned within the fuel storage tank is a submersible turbine pump for moving fuel from the tank. Adjacent to the fuel storage tank and extending primarily aboveground is a motor vehicle fueling station. Supported on the vertical riser pipe within the sump is the integrated filtration unit of this disclosure through which fuel passes from the underground storage tank to the motor vehicle fueling station.

Referring to the drawings and first to FIG. 1, the basic components making up a liquid fuel dispensing system for service stations are shown diagrammatically. An underground storage tank 10 is of the type commonly utilized to store liquid fuels, such as gasoline or diesel fuel, for delivery to vehicle owners and operators. The tank 10 is typically buried several feet below grade surface 12 which may be a paved apron of a service station having one or more fuel dispensing units 14 (only one of which is shown). Each of the fuel dispensing units 14 is of the type that includes a flexible hose 16 having a nozzle thereon for insertion into the filler neck of a vehicle fuel tank (not shown). Dispensing unit 14 includes mechanical and electrical apparatuses for measuring the quantity of fuel delivered and for displaying the quantity and the cost thereof, as well as a sump 18 therebelow which is sometimes, but not universally, employed for catching any leaked fuel.

Positioned adjacent to and directly above underground tank 10 is a containment sump 20, illustrated of a size out of proportion relative to the size of submersible tank 10. Sump 20 typically is approximately 3 to 3½ feet in diameter and 4 feet deep and is typically lined with a deformable plastic or the like to form a substantially leakproof enclosure. A manhole cover 22 closes the top of sump 20 and is usually substantially flush with grade surface 12.

A riser pipe 24 (which may also be referred to as a pump riser) extends from the top of tank 10 into containment sump 20.

Components 10-24 are those typically found in a fuel distribution system. The purpose of this invention is to provide an integrated filtration unit for filtering fuel from underground storage tank 10 prior to delivery to the fuel dispensing unit 14.

Positioned within sump 20 is the integrated filtration unit generally indicated by the numeral 26. The filtration unit includes a vessel 28 having a bottom 30, an open top 32 and a cylindrical sidewall 34. While vessel 28 is preferably cylindrical so that the sidewall 34 is cylindrical, vessel 28 can be of any other cross-sectional configuration.

Formed as a part of the vessel, and preferably integrally with it, is a partition 36 that is spaced from bottom 30 and provides, within the vessel, an upper zone 38 and a lower zone 40. The upper zone 38 is substantially larger in area than the lower zone 40.

A lid 42 closes the interior of vessel 28. Lid 42 can be removably and sealably attached to open top 32 of the vessel in a variety of ways, such as by means of bolts (not shown) around the flange periphery of the vessel. Secured in the top of lid 42 is an eyehook 44 that provides means for lifting the entire integrated filtration unit 26 when lid 42 is secured to vessel 28. This permits the entire system to be placed in position within sump 20 or removed from it when necessary.

Figure 4:
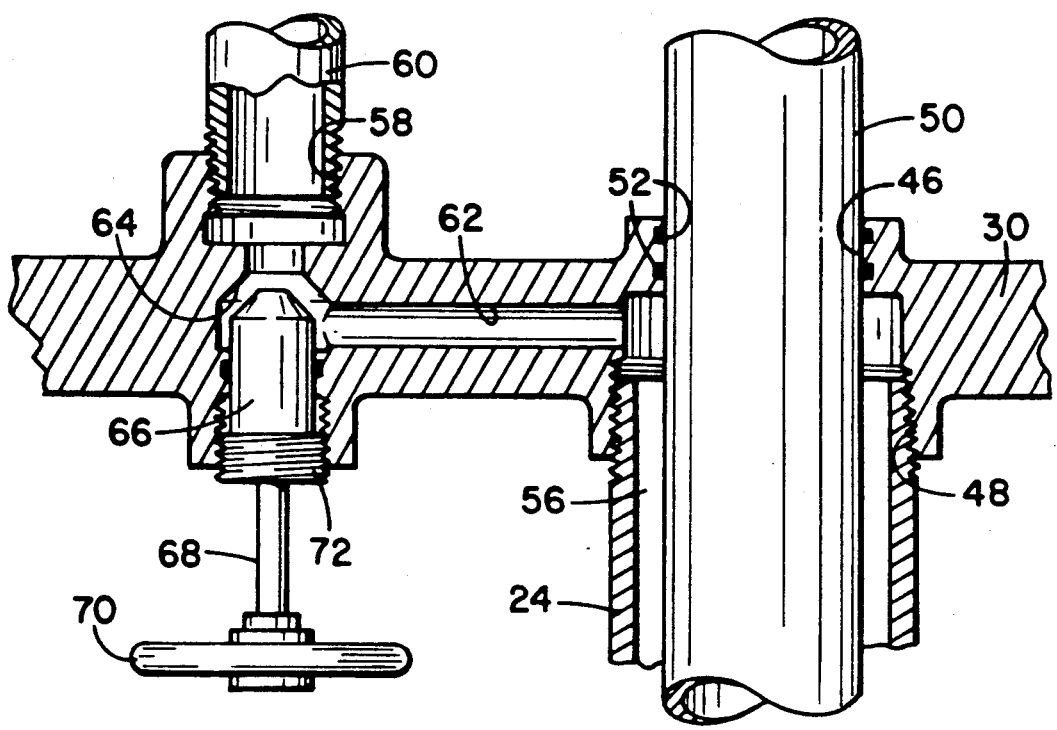
FIG. 4 is an enlarged partial cross-sectional view taken along the line 4—4 of FIG. 3 showing the details of the upper portion of the riser pipe as connected to the bottom of the vessel and a section of a fuel outlet pipe and showing details of an integral passageway and the lower portion of a vent pipe for communicating the vent pipe back to the interior of the underground storage tank through an annular area between the fuel outlet pipe and the riser pipe, and showing a valve for use in controlling the passageway between the vent pipe and the annular area.

FIG. 4 is an enlarged partial view of the center section of vessel bottom 30. Formed in vessel bottom 30 is an opening 46 that is an entry for fluid flow from underground tank 10. Opening 46 has a slightly enlarged internal diameter threaded portion 48 that receives the threaded upper end of riser pipe 24. The threaded connection between riser 24 and threaded opening 48 in the vessel bottom provides a means of supporting vessel 28 within sump 20 and no other supporting apparatus is required. Such arrangement greatly simplifies installation of the integrated filtration unit in the system.

Figure 2:
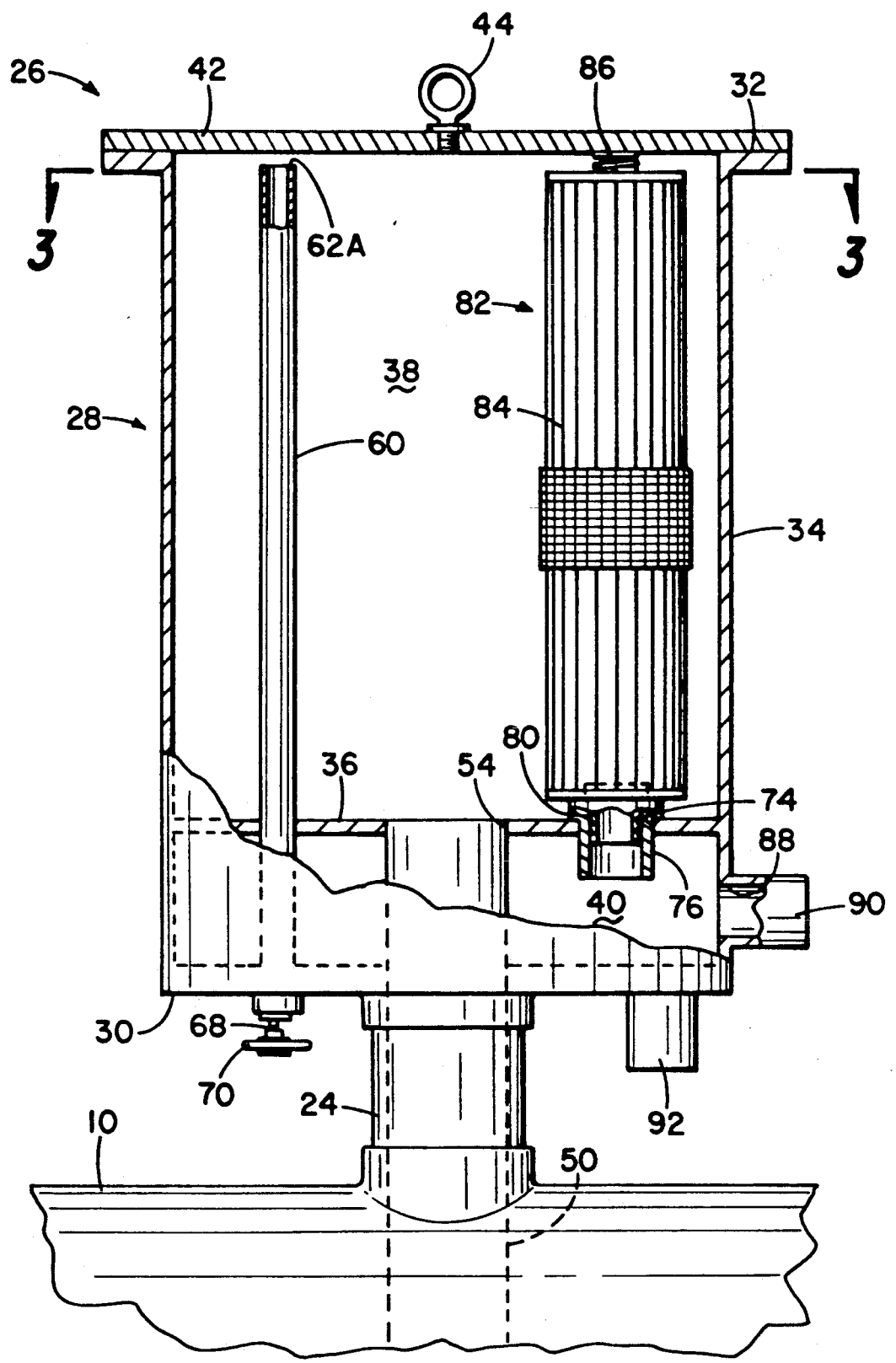
FIG. 2 is an enlarged elevational view of the integrated filtration unit shown supported on a riser pipe above a fuel storage tank, only a fragment of the fuel storage tank being shown and without the piping that extends from the filtration unit to the motor vehicle fueling station.

Extending within the interior of riser pipe 24 is a fuel outlet pipe 50 that is sealably secured to opening 46 in the vessel bottom, such as by means of O-rings 52. The fuel outlet pipe 50 extends further upwardly and, as seen in FIG. 2, is in closed contact with an opening 54 in vessel partition 36. In this manner fuel outlet pipe 50 has closed communication with the vessel upper zone 38 and seals lowers zone 40 as it passes through opening 52. A submersible pump (not shown) is typically secured at the lower end of fuel outlet pipe 50.

Since fuel outlet pipe 50 is of a smaller external diameter than the internal diameter of riser pipe 24 an annular area 56 therebetween is provided. The annular area 56 communicates with the interior of storage tank 10. Formed in vessel bottom 30, as seen in FIG. 4, is a small diameter threaded opening 58 that is spaced from the fuel outlet pipe opening 46. Received within threaded opening 58 is the lower end of a vent pipe 60. As seen in FIG. 2, the open upper end 62A of the vent pipe is in the upper end of zone 38 and communicates with the zone so that gas within upper zone 38 can pass into vent pipe 60.

Formed in the vessel bottom 30 is an internal passageway 62 that communicates vent pipe 60 with annular area 56, that is, communicates the interior open end of vent pipe 60 with the interior of storage tank 10. In this way, gas occurring within the vessel upper zone 38 can escape by way of vent pipe 60 into the interior of the storage vessel, thereby preventing gas from being trapped within vessel 28 and also preventing the gas from being discharged to the atmosphere.

A valve seat 64 is formed in passageway 62. A valve member 66 has a shaft 68 extending therefrom with a handle 70 by which the shaft and the valve member may be rotated. By means of the threaded portion 72, valve member 66 may be advanced toward or away from seat 64 to control the passageway communicating vent pipe 60 with annular area 56. The arrangement of the valve formed of components 64–72 is by way of example only as, obviously, the valve may be arranged in a variety of different ways.

Figure 3:
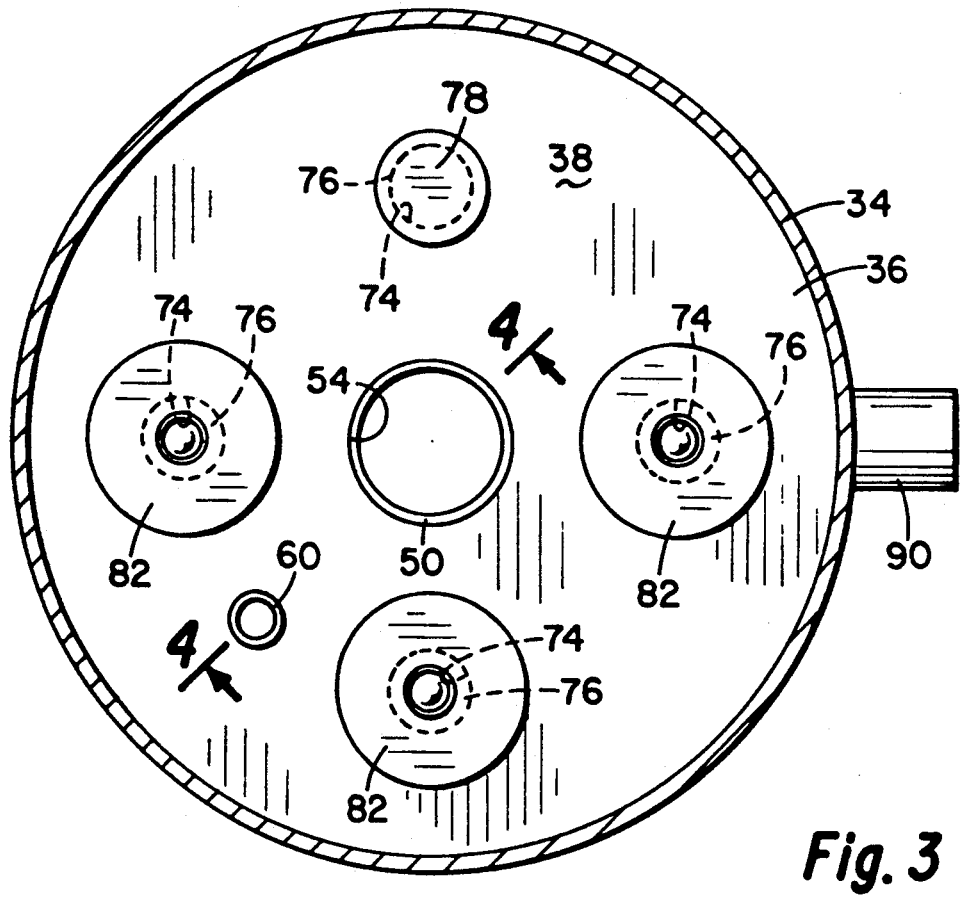
FIG. 3 is a vertical cross-sectional view taken along the line 3—3 of FIG. 2 showing the interior of the upper portion of the integrated filtration vessel.

Referring to FIG. 3, partition 36 has a plurality of smaller diameter adapter openings 74 therein (four being shown). Positioned within each adapter opening is a tubular adapter 76 having a cylindrical opening therethrough. The number of adapter openings 74 and tubular adapters 76 can vary depending upon the number of filter elements to be utililzed in each vessel. Further, not all of the adapter openings need be employed at the same time. FIG. 3 shows a cap 78 closing the top most tubular adapter. Each of the other three adapters 76 receive a tubular coupling member 80 that is a portion of a filter cartridge generally indicated by the numeral 82. The filter cartridge 82 may be of the type described in co-pending U.S. Pat. No. 4,959,141 entitled "Fuel Filter With Positive Water Shutoff", issued Sep. 25, 1990. Filter cartridge 82 has a central cylindrical tubular member (not shown) that connects with the tubular coupling member 80. Fluid within vessel upper zone 38 migrates radially inwardly through the pleated element 84 to enter the interior of the filter and passes out through tubular coupling member 80 into vessel lower zone 40.

To retain each filter cartridges 82 in position (only one of which is seen in FIG. 2) a spring 86 is utilized, the spring being compressed when lid 42 is installed. Filter cartridge 82 may be of the type which not only intercepts particulate matter but intercepts water and as it intercepts and contains water, flow of fuel through the filter is diminished, causing a back pressure to build across the filter. When sufficient back pressure builds, a ball (not shown) moves within the filter to positively shut it against further fuel flow. On the other hand, filter cartridge 82 may be of the standard type to intercept only particulate matter or it may be of the type that intercepts particulate matter and water without having a positive water shutoff. In any event, filter cartridge 82 functions to filter the fluid flowing through it.

Referring to FIG. 2, there is formed within vessel sidewall 34 and in communication with lower zone 40, a fluid outlet opening 88 which, in the embodiment illustrated, includes an integral tubular boss portion 90 that may be internally threaded to facilitate receiving piping. Preferably two or more of the fluid outlet openings 88 are provided in the vessel sidewall 34, even though only one is shown. In addition, as seen in FIG. 2, vessel 28 may include an integral boss 92 formed as a part of the vessel bottom 30 having a fluid outlet opening therein. The provision of a plurality of fluid outlet openings, some in the sidewall and some in the bottom, serves to facilitate ease of piping of the integrated filtration unit into the fuel distribution system. In actual use normally only one of the fluid outlet openings is utilized and the others are plugged.

Piping 94 connects the vessel fluid outlet to a fuel dispensing unit. While in FIG. 1 only a single fuel dispensing unit is illustrated, in the typical fuel dispensing system for motor vehicles a plurality of the fuel dispensing units are employed. Piping 94 may be rigid or flexible according to local requirements.

The system of this invention functions in this manner. A submersible pump (not shown) when energized moves fluid from within tank 10 upwardly through fuel outlet pipe 50 into vessel upper zone 38. Gas trapped within the vessel is expelled as it is filled with liquid through vent pipe 60. The gas passes downwardly through vent pipe 60, past valve member 66, through passageway 62 and into annular area 56 between fuel outlet pipe 50 and riser pipe 24, the gas being thus conveyed into the interior of underground storage tank. When the vessel is filled with fluid, the fluid migrates through the filtration element 84 of each of the filter cartridges 82 and passes downwardly through the tubular coupling member 80 of each of the filter cartridges and through tubular adapters 76 into vessel lower zone 40. From there the fluid flows out through an outlet opening 88 and, by piping 94, to a fuel dispensing unit 14. Thus, an integrated filtration unit 26 is provided as a part of the fuel distribution system of FIG. 1. The integrated filtration unit has many advantages over existing systems. For example, it is more compact than previously available units employing separate filters and pumps. Further, the integrated filtration unit is more environmentally safe as it is less likely to leak because fewer threaded connections are used. In addition, the system is less expensive as no additional mounting brackets, hoses or drains are required. It is also less expensive to install since fewer connections are made.

Some of the special features of the integrated filtration unit include the provision of the vent and drain connections integrated into vessel 28, thus, eliminating external valves and piping. This results in the saving of costs during installation and further reduces the possibility of leakage of fuel to the environment.

The integrated filtration unit is flexible as to fuel volume handling capabilities in that the number of filter cartridges employed can vary, such as from one to four in the illustrated embodiment. This allows the number of filter cartridges to be selected to conform with the volume of fuel to be pumped and which will depend upon the number of fuel dispensing units 14 at the motor vehicle fueling station. By the provision of the lifting eye 44, the entire integrated filtration unit can be installed or removed as a unit. The plurality of fluid outlet openings 88 provide for ease of connection of piping 94 to the motor vehicle fueling station. As previously stated, filter cartridge 82 can be of the simple particulate matter type or the more complex filter/absorbent type without changing any of the other features or aspects of the integrated filtration unit.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A system for dispensing liquid fuel to a motor vehicle fueling station mounted on the earth's surface, the fueling station having piping connected thereto for receiving liquid fuel, the system comprising:
   an underground sump positioned adjacent the fueling station;
   an underground storage tank buried in the earth below said underground sump and having a vertical pump riser pipe extending upwardly therefrom and into said underground sump;
   an upright vessel positioned with the underground sump, the vessel having a bottom, a sidewall, an open top and having a partition therein spaced from the bottom dividing the vessel interior into an upper zone and a lower zone, and the vessel having aligned inlet openings in the bottom and the partition and having an outlet opening communicating with the vessel lower zone, the bottom inlet opening being sealably attached to said storage tank vertical pump riser pipe providing closed communication between the underground storage tank and the vessel, the partition having at least one adapter opening therethrough spaced from said inlet opening in the partition, the vessel being supported by said pump riser pipe within said underground sump, the vessel outlet opening being connected to the fueling station piping;
   a vertical fuel outlet pipe received within said vessel bottom inlet opening and telescopically received in said pump riser pipe, said fuel outlet pipe having a lower end extending within said fuel storage tank and an upper end sealably secured to said inlet opening in the partition;
   means sealing the exterior of said fuel outlet pipe to said vessel bottom inlet opening;
   at least one filter cartridge removably positioned within said vessel upper zone having a filter fuel outlet in closed communication with said at least one adapter opening in said partition; and
   a removable lid attachable to and for sealably closing said vessel top, fuel flowing from the storage tank passing upwardly through said fuel outlet pipe and into said vessel upper zone, through said at least one filter cartridge into said vessel lower zone, out through said vessel outlet opening and through the fueling station piping to the motor vehicle fueling station.

2. A system for dispensing liquid fuel according to claim 1 wherein said fuel outlet pipe and said pump riser pipe are dimensioned to provide an annular area therebetween that communicates with the interior of said underground storage tank.

3. A system for dispensing liquid fuel according to claim 2 including:
   a vertical vent pipe within said vessel having an open upper end communicating with the upper portion of said vessel upper zone and a lower end; and
   means communicating said vent pipe lower end with said annular area between said fuel outlet pipe and said pump riser pipe.

4. A system for dispensing liquid fuel according to claim 3 including:
   a valve means interposed between said vent pipe lower end and said annular area.

5. A system for dispensing liquid fuel according to claim 3 wherein said vessel bottom has an internal passageway therein providing said means of communicating said vent pipe lower end with said annular area between said fuel outlet pipe and said pump riser pipe.

6. A system for dispensing liquid fuel according to claim 5 including:
   valve means in said integral passageway including valve control means extending exteriorly of said vessel.

7. A system for dispensing liquid fuel according to claim 1 including:
   a tubular adapter received in each of said at least one adapter opening in said vessel partition providing a cylindrical opening therethrough and wherein each said at least one filter cartridge includes an integrally extending tubular coupling member providing said filter fuel outlet, the tubular coupling being sealably telescopically receivable in the tubular adapter whereby each of said at least one filter cartridge may be easily removably positioned in said vessel upper zone.

8. A system for dispensing liquid fuel according to claim 1 including:
   a lifting eye affixed to said lid providing means when said lid is attached to said vessel of lifting said vessel to facilitate securing said vessel to said riser pipe.

9. A system for dispensing liquid fuel according to claim 1 wherein each of said filter cartridges is capable of preventing the passage of water therethrough.

* * * * *